(12) United States Patent
Cheng

(10) Patent No.: US 10,754,162 B2
(45) Date of Patent: Aug. 25, 2020

(54) PROJECTION APPARATUS AND HEAD-MOUNTED DISPLAY DEVICE

(71) Applicant: Coretronic Corporation, Hsin-Chu (TW)

(72) Inventor: Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/377,253

(22) Filed: Apr. 8, 2019

(65) Prior Publication Data

US 2019/0377185 A1 Dec. 12, 2019

(30) Foreign Application Priority Data

Jun. 8, 2018 (CN) ............ 2018 1 0585601

(51) Int. Cl.
  *G02B 27/01* (2006.01)
  *F21V 8/00* (2006.01)
  *G03B 21/20* (2006.01)

(52) U.S. Cl.
  CPC ....... *G02B 27/0172* (2013.01); *G02B 6/0075* (2013.01); *G03B 21/208* (2013.01); *G03B 21/2013* (2013.01); *G02B 2027/0114* (2013.01); *G02B 2027/0116* (2013.01); *G02B 2027/0118* (2013.01); *G03B 21/2033* (2013.01)

(58) Field of Classification Search
  None
  See application file for complete search history.

(56) References Cited

U.S. PATENT DOCUMENTS

| 8,104,898 B2 | 1/2012 | Liao et al. |
| 9,482,937 B2 | 11/2016 | Cheng |
| 2003/0039036 A1 | 2/2003 | Kruschwitz et al. |
| 2018/0143440 A1 | 5/2018 | Cheng et al. |

FOREIGN PATENT DOCUMENTS

| JP | 2003029203 | 1/2003 |
| TW | 200839291 | 10/2008 |

OTHER PUBLICATIONS

"Search Report of Europe Counterpart Application," dated Oct. 28, 2019, pp. 1-6.

*Primary Examiner* — Jerry Rahll
(74) *Attorney, Agent, or Firm* — JCIPRNET

(57) ABSTRACT

A projection apparatus including an image device and an illumination system is provided. The image device is configured to convert a first illumination beam into an image beam. The illumination system includes a light source, a collimating lens element and a light homogenizing element. The light source provides an illumination beam. The illumination beam sequentially passes through the collimating lens element and the light homogenizing element and is transmitted to the image device. The light source includes a solid-state illuminating source array. The solid-state illuminating source array includes a plurality of solid-state illuminating sources arranged in an array. The image beam exits the projection apparatus and is converged to a stop. The stop is located outside the projection apparatus. Moreover, a head-mounted display device including the projection apparatus is also provided. A display image provided by the head-mounted display device has uniform brightness and chrominance.

20 Claims, 8 Drawing Sheets

PROJECTION APPARATUS AND HEAD-MOUNTED DISPLAY DEVICE

CROSS-REFERENCE TO RELATED APPLICATION

This application claims the priority benefit of China application serial no. 201810585601.1, filed on Jun. 8, 2018. The entirety of the above-mentioned patent application is hereby incorporated by reference herein and made a part of this specification.

BACKGROUND OF THE INVENTION

Field of the Invention

The invention relates to an optical device and a display device, and particularly relates to a projection apparatus and a head mounted display device, and the projection apparatus is disposed in the head-mounted display device.

Description of Related Art

Near eye display (NED) and head-mounted display (HMD) device are the most promising killer products of the next generation. Related applications of the NED technique are presently divided into an augmented reality (AR) technique and a virtual reality (VR) technique. Related developers are currently working on how to provide better image quality with thinner and slimmer products.

In an AR optical framework of the HMD device, an image beam used for displaying is emitted from the projection apparatus, and transmitted by a waveguide element to enter an eye of a user. The image beam used for displaying an image and an external environmental beam (environment image) may both enter the eye of the user to achieve the AR display effect. In the AR optical framework of the HMD device, in order to reduce a volume, light-emitting diodes (LEDs) of two channels (light transmission paths) are generally adopted to provide an illumination beam, where one channel of light-emitting diodes includes green LEDs, and another channel of light-emitting diodes includes red and blue LEDs. However, central optical paths of a green, a red and a blue beams in the framework may respectively be skewed, which results in uneven brightness and chrominance of a display image received by the user's eye.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a projection apparatus and a head-mounted display (HMD) device, where a display image provided by the projection apparatus has even brightness and chrominance.

Other objects and advantages of the invention may be further illustrated by the technical features broadly embodied and described as follows.

In order to achieve one or a portion of or all of the objects or other objects, an embodiment of the invention provides a projection apparatus including an image device and an illumination system. The image device is configured to convert a first illumination beam into an image beam. The illumination system includes a first light source, a first collimating lens element and a light homogenizing element. The first light source provides the first illumination beam. The first illumination beam sequentially passes through the first collimating lens element and the light homogenizing element and is transmitted to the image device. The first light source includes a first solid-state illuminating source array. The first solid-state illuminating source array includes a plurality of solid-state illuminating sources arranged in an array. The image beam exits the projection apparatus and is converged to a stop. The stop is located outside the projection apparatus.

In order to achieve one or a portion of or all of the objects or other objects, an embodiment of the invention provides a HMD device including a projection apparatus and at least one waveguide element. The projection apparatus includes an image device and an illumination system. The image device is configured to convert a first illumination beam into an image beam. The illumination system includes a first light source, a first collimating lens element and a light homogenizing element. The first light source provides the first illumination beam. The first illumination beam sequentially passes through the first collimating lens element and the light homogenizing element and is transmitted to the image device. The first light source includes a first solid-state illuminating source array. The first solid-state illuminating source array includes a plurality of solid-state illuminating sources arranged in an array. The at least one waveguide element has a light incident end and a light emerging end. The light incident end is configured to receive the image beam. The image beam is transmitted by the at least one waveguide element and emitted from the light emerging end. The image beam exits the projection apparatus and is converged to a stop. The stop is located outside the projection apparatus.

According to the above description, in the embodiment of the invention, the light source includes the solid-state illuminating source array, and the solid-state illuminating source array includes a plurality of solid-state illuminating sources arranged in an array. The solid-state illuminating source array is coordinated with the collimating lens element to make the display image provided by the projection apparatus to have uniform brightness and chrominance.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
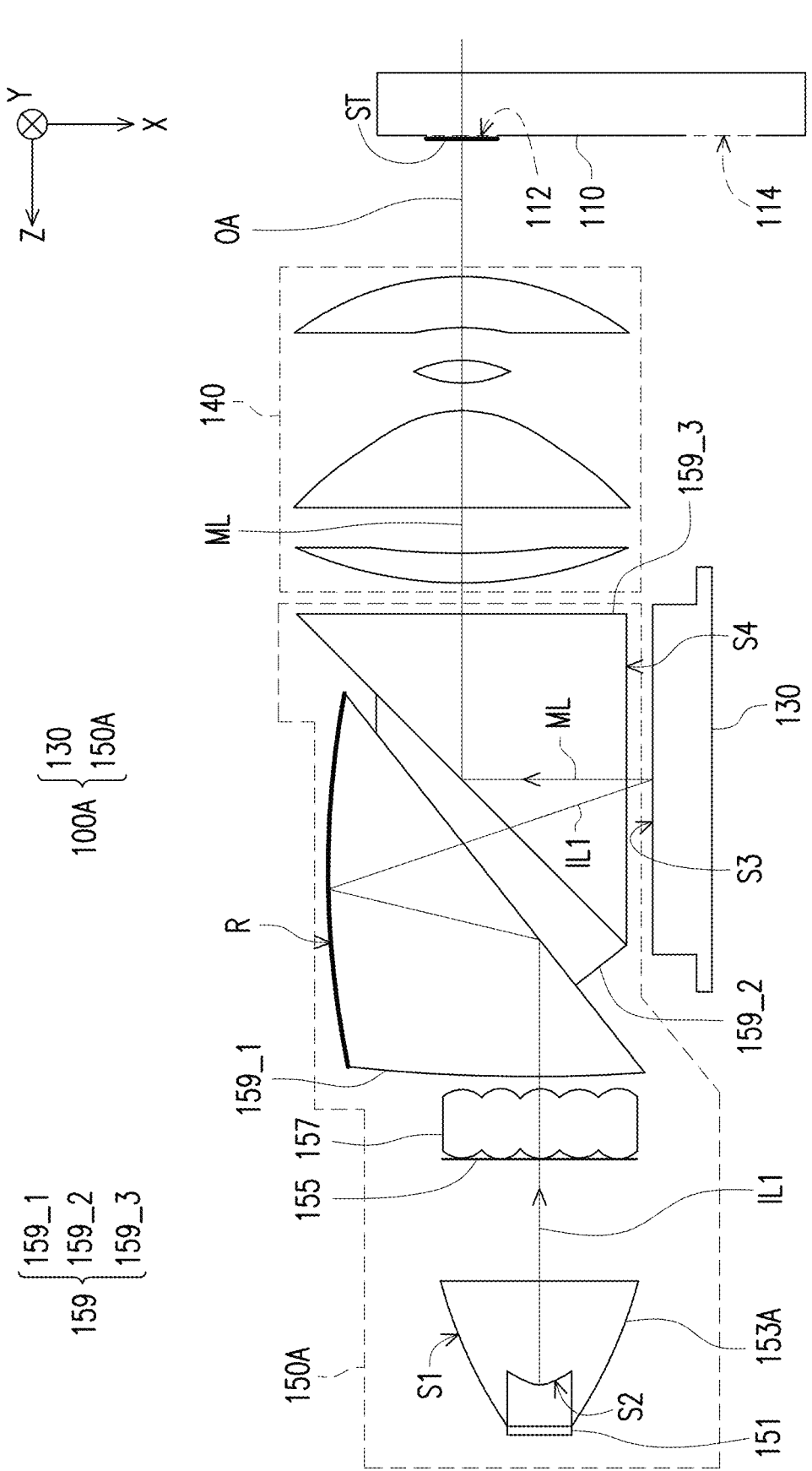
FIG. 1 is a schematic diagram of a head-mounted display (HMD) device according to an embodiment of the invention.

FIG. 1 is a schematic diagram of a head-mounted display (HMD) device according to an embodiment of the invention. Referring to FIG. 1, the projection apparatus 100A of the embodiment includes an illumination system 150A and an image device 130, and the projection apparatus 100A is used in the HMD device 10A. In the embodiment, the image device 130 is, for example, a light valve, and the light valve, for example, includes a Digital Micro-mirror Device (DMD), which is used for converting an illumination beam IL1 (a first illumination beam) coming from the illumination system 150A into an image beam ML. In an embodiment, the image device 130, for example, includes a Liquid Crystal On Silicon (LCoS) display device, and the type of the image device 130 is not limited by the invention.

In the embodiment, along a transmission path OA of the image beam ML, the image beam ML is transmitted to a projection target (not shown), which is, for example, a human eye, through the lens module 140 and the waveguide element 110. The lens module 140 and the waveguide element 110 shown in FIG. 1 are only used as examples, and are not intended to be a limitation of the invention. In the embodiment, the waveguide element 110 has a light incident end 112 and a light emerging end 114. The light incident end 112 is configured to receive the image beam ML. The image beam ML is transmitted through the waveguide element 110 and emitted from the light emerging end 114. Positions of the light incident end 112 and the light emerging end 114 of the waveguide element 110 are not limited, and the positioned may be changed as required by the relative position among the projection apparatus, the waveguide element and the projection target. Moreover, the number of the waveguide elements is not limited by the disclosure, and the number is determined by a design of the HMD device. For example, if the HMD device has two waveguide elements, one waveguide element has the light incident end, and another waveguide element has the light emerging end. As such, the light emerging end and the light incident end may not be limited to be on the same waveguide element. The image beam ML exiting the projection apparatus 100A is converged to a stop ST, and is transmitted to the waveguide element 110.

In the embodiment, the stop ST is located outside the projection apparatus 100A. For example, it may be located at the light incident end 112 of the waveguide element 110. In other embodiments, the position of the stop ST may be between the projection apparatus and the waveguide element, or the position of the stop ST may be inside the waveguide element. The image beam L may have a minimum cross-section area at the location of the stop. For example, in the embodiment, the stop ST, for example, has a round shape, which is located on a plane formed by an X-axis and a Y-axis, and the size of the stop ST in an X-axis direction is the same as that in a Y-axis direction. In the embodiment, the shape and the size of the stop ST are only an example, which are not used for limiting the invention. In the embodiment, the image beam ML exits the projection apparatus 100A and is converged to the stop ST, and is diverged after passing through the stop ST. In the embodiment, along the transmission path of the light beam, the image device 130 is located between the illumination system 150A and the stop ST.

Figure 2:
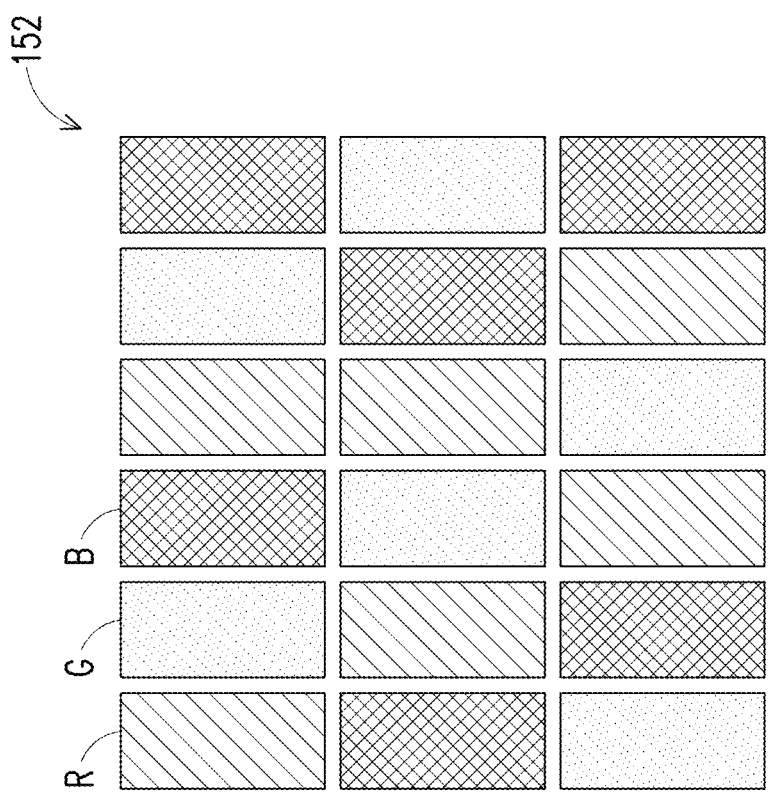
FIG. 2 is a schematic diagram of a solid-state illuminating source array according to an embodiment of the invention.

In the embodiment, the illumination system 150A is used for providing the illumination beam IL1 to the image device 130. The illumination system 150A includes a light source 151 (a first light source), a collimating lens 153A (a first collimating lens), a diffusion element 155, a light homogenizing element 157 and a prism module 159. The light source 151, for example, includes a solid-state illuminating source array 152, as shown in FIG. 2. FIG. 2 is a schematic diagram of the solid-state illuminating source array according to an embodiment of the invention. Referring to FIG. 2, the solid-state illuminating source array 152 includes a plurality of Light-Emitting Diodes (LEDs) arranged in an array, or a plurality of Laser Diodes (LDs) arranged in an array, and the solid-state illuminating source array 152 is used for providing the illumination beam ILL In the embodiment, the solid-state illuminating source array 152 includes red LEDs R, green LEDs G and blue LEDs B, where colors of light beams emitted from the adjacent LEDs are different. By arranging the solid-state illuminating source array 152 in an array, brightness and color uniformity of the illumination beam IL1 is maintained. Further, since the solid-state illuminating source array 152 is arranged in an array and the illumination beam IL1 passes through the collimating lens 153A, the diffusion element 155 and the light homogenizing element 157, the brightness and color uniformity of the illumination beam IL1 is maintained. In the embodiment, the collimating lens 153A includes an outer curved surface S1 and an inner curved surface S2. The outer curved surface S1 is, for example, a parabolic curved surface or a freeform curved surface. The inner curved surface S2 is, for example, a spherical surface, an aspherical surface, a biconic curved surface or a freeform curved surface. In the embodiment, the type of the curved surfaces of the collimating lens 153A is not limited by the invention.

In the embodiment, the illumination beam IL1 is transmitted to the image device 130 through the collimating lens 153A, the diffusion element 155, the light homogenizing element 157 and the prism module 159. In the embodiment, the diffusion element 155 is, for example, a diffuser with a diffusion angle of 60 degrees, and the diffusion angle thereof may be circularly symmetric, uniaxially symmetric or asymmetric, though the invention is not limited thereto. Diffusers of other diffusion angles may also be adopted according to a design requirement, and specifications of the diffusers are not limited by the invention. The diffusion element 155 may be fabricated into a thin film with a thickness smaller than 0.5 mm. The diffusion element 155 is disposed between the collimating lens 153A and the light homogenizing element 157, and the light homogenizing element 157 is, for example, a lens array, and the lens array may also be a fly-eye lens array. In the embodiment, the light homogenizing element 157 may comprise a plurality of lens arrays, which is not limited by the invention.

In the embodiment, the prism module 159 includes a first prism 159_1, a second prism 159_2 and a third prism 159_3. In the embodiment, the first prism 159_1 has a curved surface, and the curved surface of the first prism 159_1 may have a reflection layer R, where the reflection layer R may be a coating layer or may be a reflector attached to the curved surface of the first prism 159_1. The curved surface is configured to reflect the illumination beam IL1 coming from the light homogenizing element 157, though the invention is not limited thereto. In other embodiments, the first prism 159_1 has a curved surface, and the reflection layer R is not required. By way of total internal reflection, the curved surface of the first prism 159_1 may reflect the illumination beam IL1 coming from the light homogenizing element 157, though the invention is not limited thereto.

In the embodiment, a gap exists between each two prisms shown in FIG. 1. For example, a first gap is located between the first prism 159_1 and the second prism 159_2, a second gap is located between the second prism 159_2 and the third prism 159_3. The illumination beam IL1 coming from the light homogenizing element 157 sequentially passes through the first prism 159_1, the curved surface of the first prism 159_1, the first gap, the second prism 159_2, the second gap and the third prism 159_3 and is transmitted to the image device 130. In another embodiment, the first prism 159_1 and the second prism 159_2 may be adhered through a transparent adhesive, and the second prism 159_2 may be attached to the third prism 159_3. The transparent adhesive is different from the first prism 159_1, the second prism 159_2 and the third prism 159_3 in refractive index.

In the embodiment, the image device 130 includes a light valve. The light valve has an active surface S3 used for receiving the illumination beam IL1 coming from the illumination system 150A. An area of the active surface S3 used for receiving the illumination beam IL1 is smaller than an area of a surface S4 of the third prism 159_3 facing the active surface S4 of the light valve, i.e. S4>S3, so that the illumination beam IL1 coming from the third prism 159_3 and received by the active surface S3 of the light valve has a maximum effective irradiation range. As such, the active surface S3 of the light valve may be effectively used.

Figure 3:
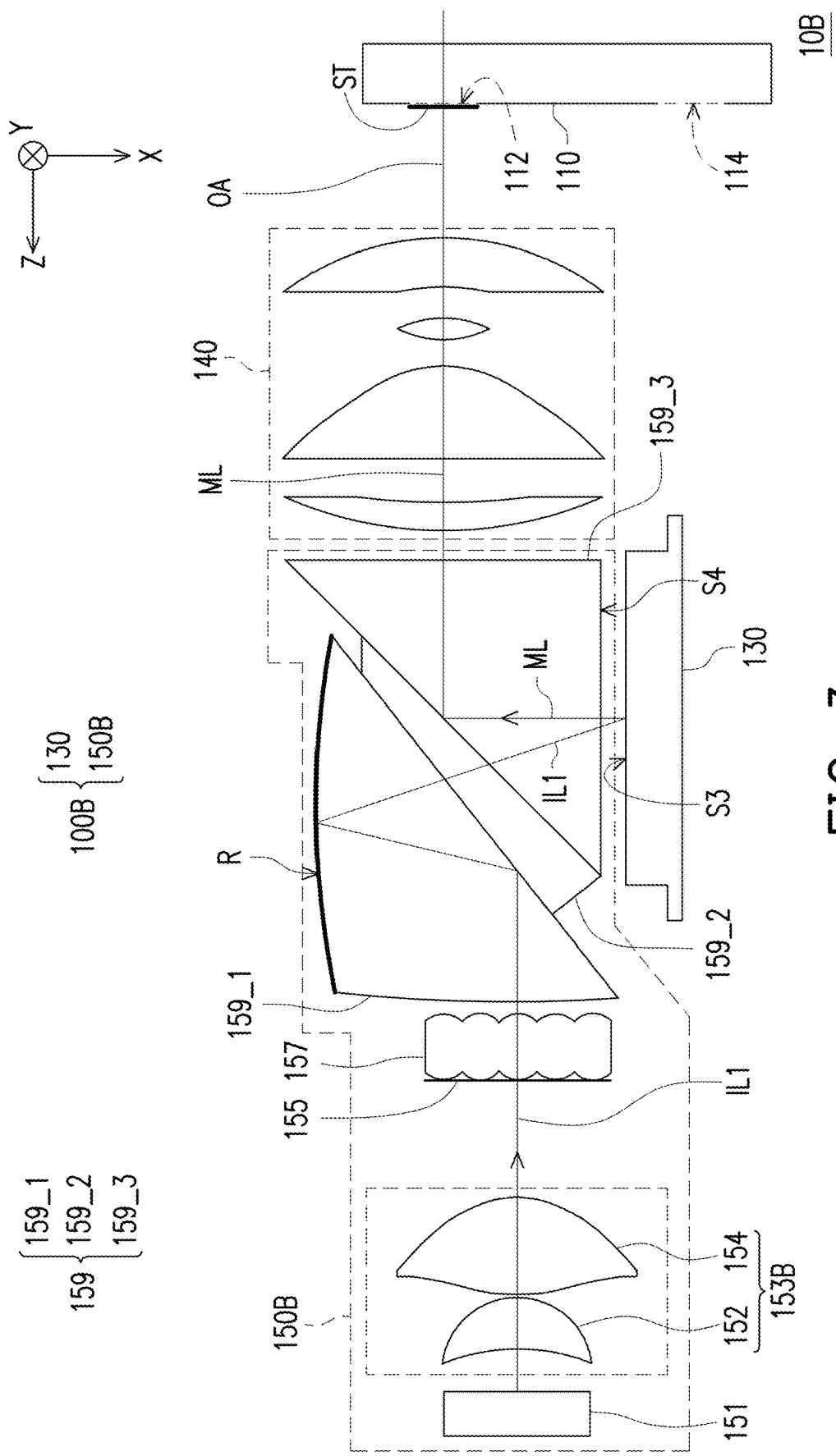
FIG. 3 is a schematic diagram of a HMD device according to another embodiment of the invention.

FIG. 3 is a schematic diagram of a HMD device according to another embodiment of the invention. Referring to FIG. 1 and FIG. 3, the projection apparatus 100B of the embodiment is similar to the projection apparatus 100A of FIG. 1, and a main difference there between, for example, lies in a design method of the collimating lens element. Referring to FIG. 3, in detail, in the embodiment, the collimating lens element is, for example, a collimating lens group 153B. The collimating lens group 153B at least includes a first lens 152 and a second lens 154, which are configured to project the collimated illumination beam IL1 to the diffusion element 155 and the light homogenizing element 157. In the embodiment, the light source 151, for example, includes a solid-state illuminating source array 152 formed by red LEDs R, green LEDs G and blue LEDs B arranged in an array, as shown in FIG. 2. In the embodiment, the illumination beam IL1 is transmitted to the image device 130 through the collimating lens group 153B, the diffusion element 155, the light homogenizing element 157 and the prism module 159.

Figure 4:
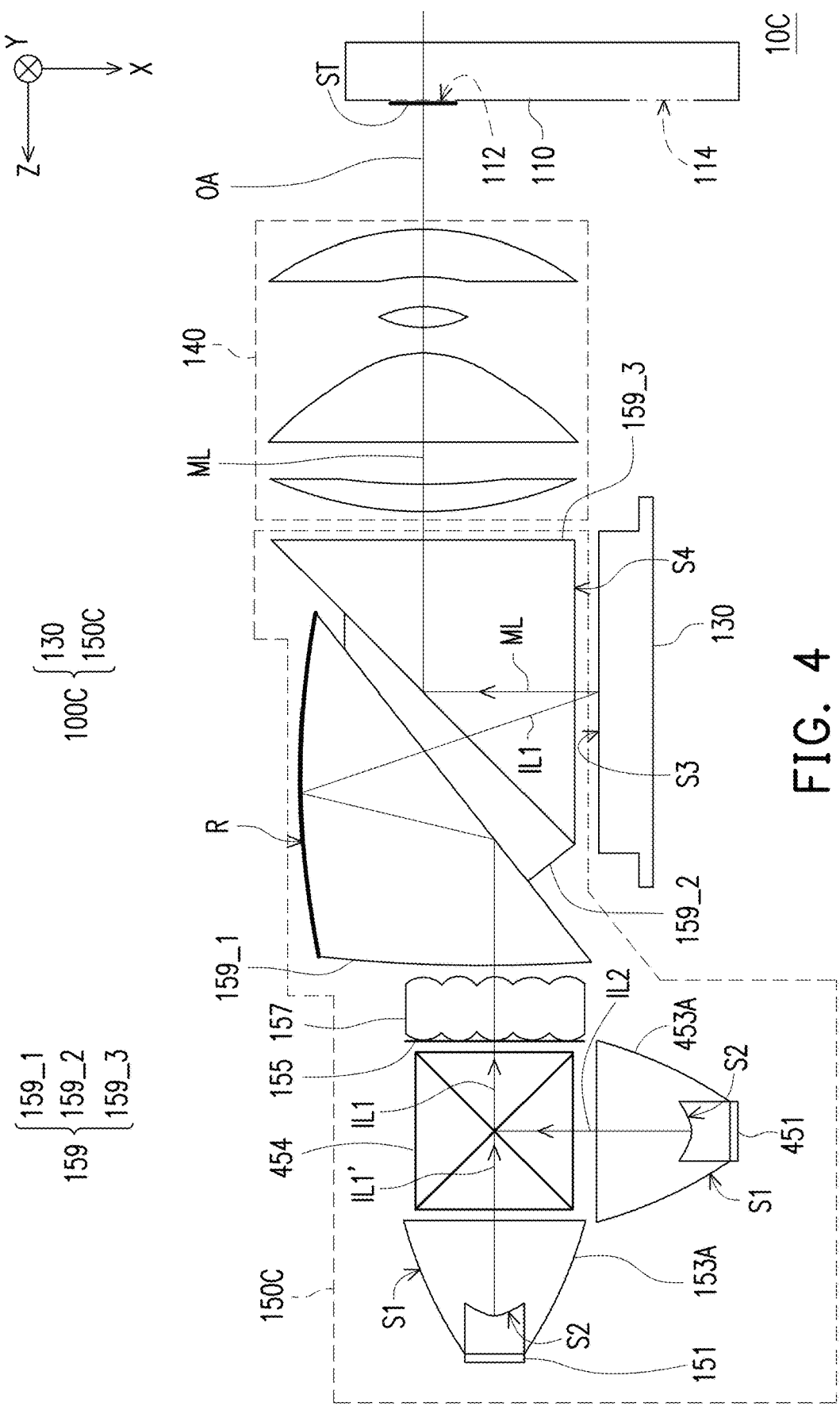
FIG. 4 is a schematic diagram of a HMD device according to another embodiment of the invention.

FIG. 4 is a schematic diagram of a HMD device according to another embodiment of the invention. Referring to FIG. 1 and FIG. 4, the projection apparatus 100C of the embodiment is similar to the projection apparatus 100A of FIG. 1, and a main difference there between lies in a design method of the illumination system.

To be specific, in the embodiment, the illumination system 150C further includes a light source 451 (a second light source), a collimating lens 453A (a second collimating lens element) and a light combining element 454. The light source 451 is used for providing an illumination beam IL2 (a second illumination beam). The light combining element 454 is, for example, a dichroic prism and an X-plate of dichroic mirrors, which is used for integrating the illumination beam IL1' and the illumination beam IL2 to form the illumination beam ILL where the illumination beam IL1' is, for example, a green light, and the illumination beam IL2 is, for example, a red light and a blue light, though the invention is not limited thereto. The illumination beam IL1 sequentially passes through the diffusion element 155, the light homogenizing element 157 and the prism module 159 and is transmitted to the image device 130. In the embodiment, shapes of an outer curved surface and an inner curved surface of the collimating lens 453A are similar to that of the collimating lens 153A, so that optical characteristics thereof may be appreciated accordingly, and detail thereof is not repeated.

Figure 5A:
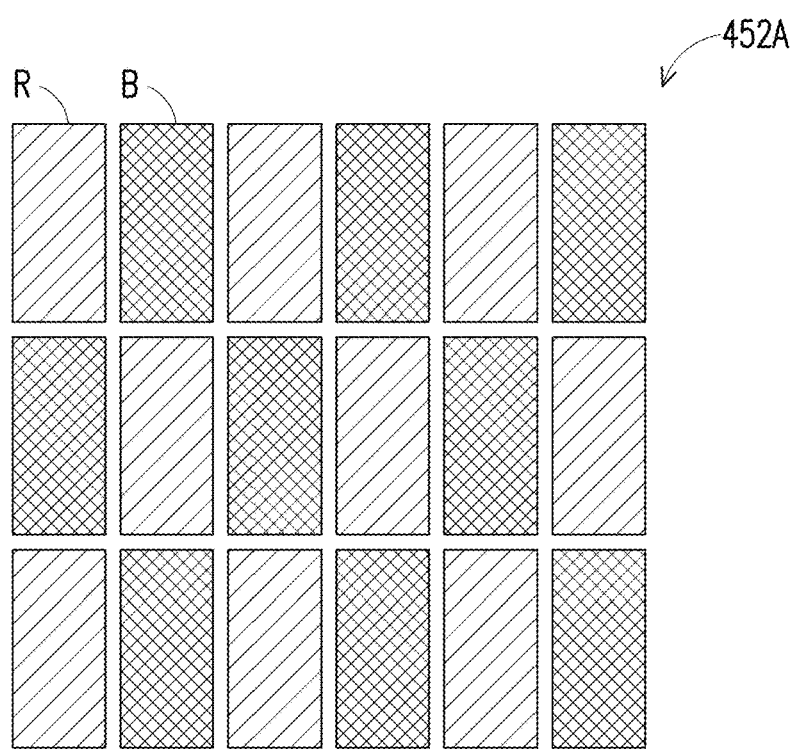
FIG. 5A is a schematic diagram of a solid-state illuminating source array according to another embodiment of the invention.

In the embodiment, the light source 151, for example, includes a solid-state illuminating source array formed by all green LEDs G arranged in an array. In the embodiment, the light source 451, for example, includes a solid-state illuminating source array 452A, as shown in FIG. 5A. FIG. 5A is a schematic diagram of a solid-state illuminating source array according to another embodiment of the invention. Referring to FIG. 5A, the solid-state illuminating source array 452A includes a plurality of LEDs arranged in an array or a plurality of laser diodes arranged in an array. The solid-state illuminating source array 452A is used for providing the illumination beam IL2. In the embodiment, the solid-state illuminating source array 452A includes red LEDs R and blue LEDs B arranged in an interleaving manner as that shown in FIG. 5A.

Figure 5B:
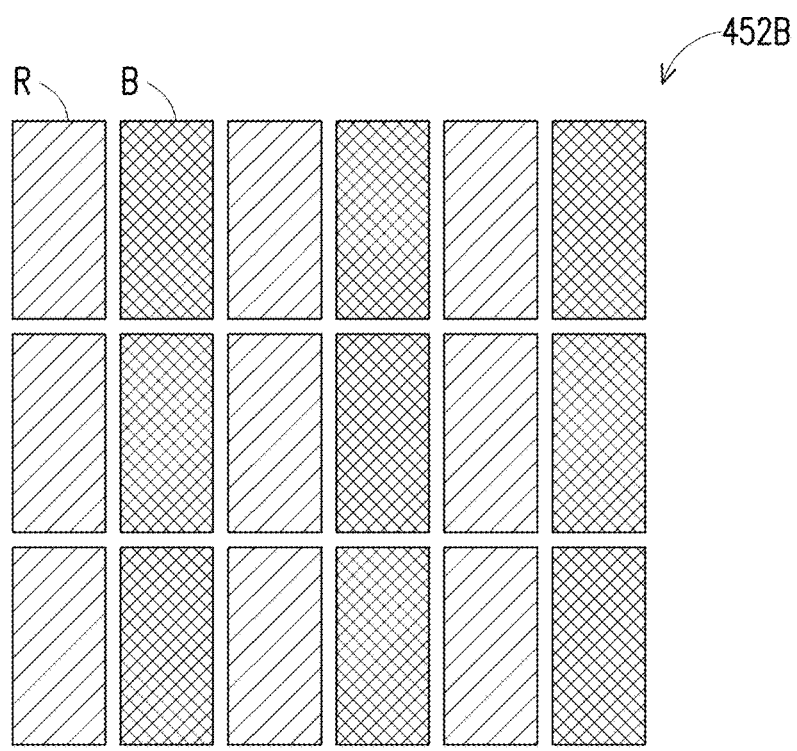
FIG. 5B is a schematic diagram of a solid-state illuminating source array according to another embodiment of the invention.

FIG. 5B is a schematic diagram of a solid-state illuminating source array according to another embodiment of the invention. In the embodiment of FIG. 4, the light source 451 may also include the solid-state illuminating source array 452B shown in FIG. 5B, where several columns of the red LEDs R and several columns of the blue LEDs B are arranged in a spaced manner.

Figure 6:
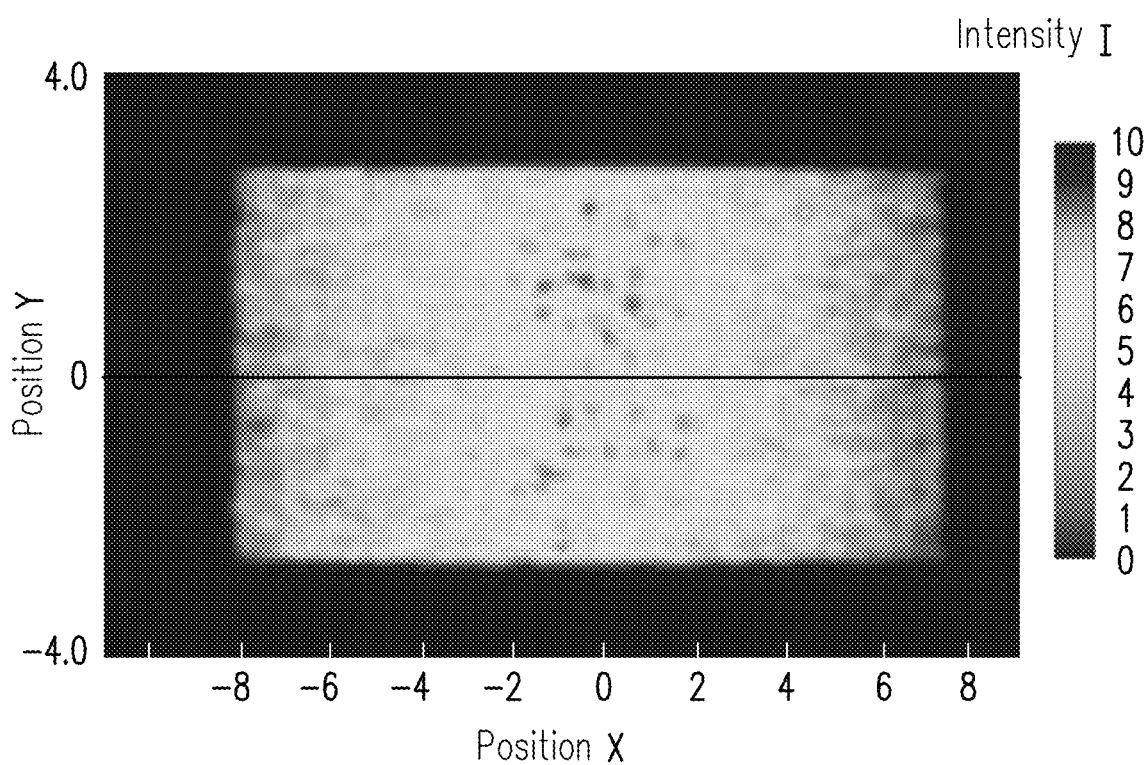
FIG. 6 is an energy intensity distribution diagram of an image beam of FIG. 4 at the stop.
Figure 7:
FIG. 7 is an energy intensity distribution diagram of the image beam at a position Y=0 in an X direction.

FIG. 6 is an energy intensity distribution diagram of the image beam of FIG. 4 at the stop ST. FIG. 7 is an energy intensity distribution diagram of the image beam at a position Y=0 in an X direction. Referring to FIG. 6 and FIG. 7, the projection apparatus 100C of the embodiment of FIG. 4 adopts the solid-state illuminating source arrays of two channels to provide the illumination beam. One channel is used for the solid-state illuminating source array 151 having the green LEDs. Such solid-state illuminating source array 151 having the red LEDs is used for providing a green light, and is used in collaboration with the collimating lens 153A. Another channel is used for the solid-state illuminating source array 452A having the red LEDs and blue LEDs. Such solid-state illuminating source array 452A having the red LEDs and blue LEDs is used for providing a red light and a blue light, and is used in collaboration with the collimating lens 453A, to improve angular space uniformity of the red light and the blue light at the stop. Color aberration of image produced by the image beam passing through the waveguide element may be avoided. The so-called angular space is a technical term known to those skilled in the art. According to FIG. 6 and FIG. 7, in the optical framework, the center optical paths of the green light, the red light and the blue light may coincide with one another, so as to avoid uneven energy intensity distribution of the image beam ML at the stop. Therefore, the display image provided by the projection apparatus 100C has uniform brightness and chrominance.

Figure 8:
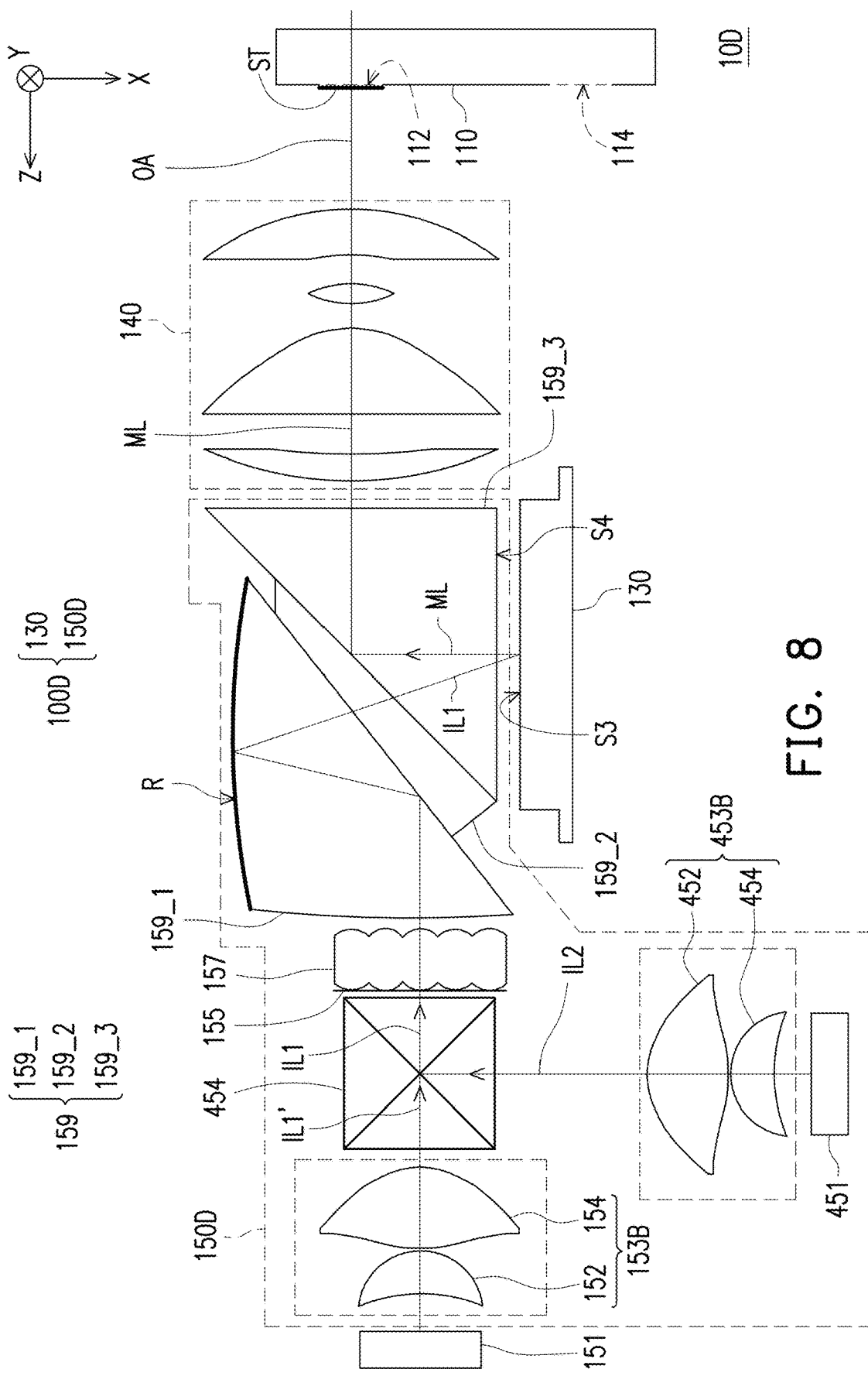
FIG. 8 is a schematic diagram of a HMD device according to another embodiment of the invention.

FIG. 8 is a schematic diagram of a HMD device according to another embodiment of the invention. Referring to FIG. 4 and FIG. 8, the projection apparatus 100D of the embodiment is similar to the projection apparatus 100C of FIG. 4, and a main difference there between lies in a design method of the collimating lens element.

Referring to FIG. 8, to be specific, in the embodiment, the first collimating lens element is, for example, the collimating lens group 153B. The collimating lens group 153B at least includes the first lens 152 and the second lens 154. The light source 151, for example, includes a solid-state illuminating source array formed by green LEDs arranged in an array. The second collimating lens element is, for example, the collimating lens group 453B. The collimating lens group 453B at least includes a third lens 452 and a fourth lens 454. In the embodiment, the light source 451, for example, includes a solid-state illuminating source array 152 formed by red LEDs R, and blue LEDs B arranged in an array, as shown in FIG. 5A or FIG. 5B. In the embodiment, the illumination beam IL1 is transmitted to the image device 130 through the diffusion element 155, the light homogenizing element 157 and the prism module 159.

Figure 9:
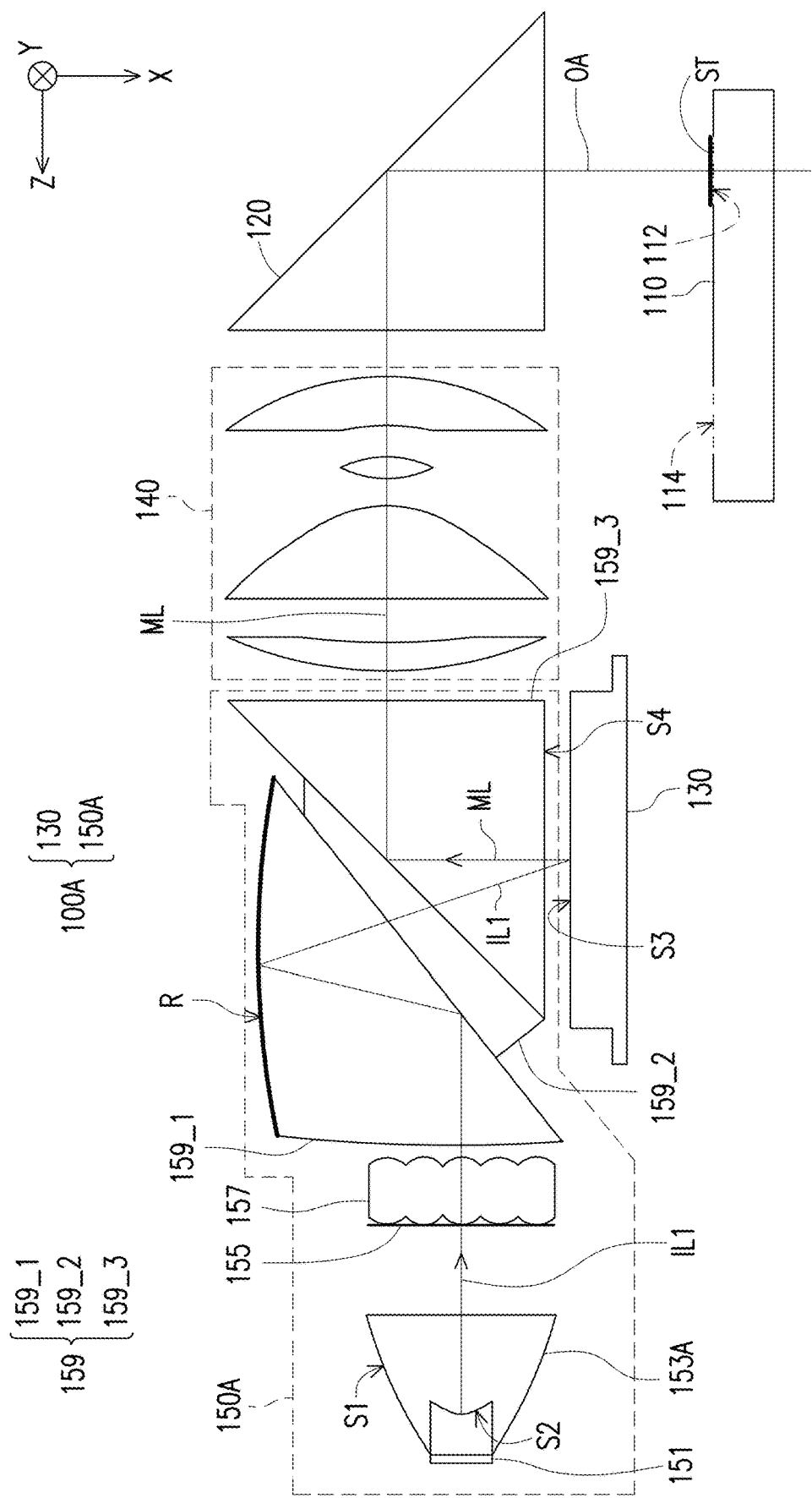
FIG. 9 is a schematic diagram of a HMD device according to another embodiment of the invention.

FIG. 9 is a schematic diagram of a HMD device according to another embodiment of the invention. Referring to FIG. 1, the HMD device 10E of the embodiment is similar to the HMD device 10A of FIG. 1, and a main difference there between is that a light turning element is disposed between the projection apparatus and the at least one waveguide element.

Referring to FIG. 9, to be specific, in the embodiment, along the transmission path OA of the image beam ML, the image beam ML exits the projection apparatus 100E through projection of the lens module 140, and is transmitted to the light turning element 120, and the light turning element 120 turns a transmitting direction of the image beam ML, such that the turned image beam ML may be transmitted to the waveguide element 110. In the invention, by configuring the light turning element 120, the transmitting direction of the image beam ML is adjusted, so that a manufacturer may produce various HMD devices with different image beam projection directions.

In summary, in the embodiment of the invention, the illumination system may adopt a single channel to provide the illumination beam, or adopt two channels to provide the illumination beam. The collimating lens element may be adopted to reduce a volume of the illumination system. No matter what optical framework is adopted, the beam comes from a solid-state illuminating source array. Center optical paths of the green light, the red light and the blue light coincide with one another, so as to avoid uneven energy intensity distribution of the image beam at the stop. Therefore, the display image provided by the projection apparatus 100C has uniform brightness and chrominance. Moreover, in the embodiments of the invention, the design of the collimating lens element may effectively reduce the volume of the illumination system, so as to reduce the manufacturing cost of the illumination system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection apparatus, comprising:
   an image device, configured to convert a first illumination beam into an image beam; and
   an illumination system, comprising:
      a first light source;
      a first collimating lens element; and
   a light homogenizing element, wherein the first light source provides the first illumination beam, the first illumination beam sequentially passes through the first collimating lens element and the light homogenizing element and is transmitted to the image device,
      wherein the first light source comprises a first solid-state illuminating source array, and the first solid-state illuminating source array comprises a plurality of solid-state illuminating sources arranged in an array, and
      wherein the image beam exits the projection apparatus and is converged to a stop, and the stop is located outside the projection apparatus, wherein the solid-state illuminating sources of the first solid-state illuminating source array comprise red solid-state illuminating sources and blue solid-state illuminating sources, and colors of light beams emitted from the adjacent solid-state illuminating sources are different.

2. The projection apparatus of claim 1, wherein the solid-state illuminating sources of the first solid-state illuminating source array further comprise green solid-state illuminating sources.

3. The projection apparatus of claim 1, wherein the first collimating lens element comprises a collimating lens, the collimating lens comprises an outer curved surface and an inner curved surface, wherein the outer curved surface is a parabolic curved surface or a freeform curved surface, and the inner curved surface is a spherical surface, an aspherical surface, a biconic curved surface or a freeform curved surface.

4. The projection apparatus of claim 1, wherein the first collimating lens element comprises a collimating lens group, and the collimating lens group comprises at least two lenses.

5. The projection apparatus of claim 1, wherein the image device is located between the illumination system and the stop, the image beam exiting the projection apparatus is transmitted to at least one waveguide element, the at least one waveguide element has a light incident end and a light emerging end, the light incident end is configured to receive the image beam, and the image beam is transmitted by the at least one waveguide element and emitted from the light emerging end.

6. The projection apparatus of claim 5, further comprising a light turning element, wherein the image beam is projected to exit the projection apparatus, and is transmitted to the light turning element, and the light turning element turns a transmitting direction of the image beam for transmitting the image beam to the at least one waveguide element.

7. A projection apparatus, comprising:
   an image device, configured to convert a first illumination beam into an image beam; and
   an illumination system, comprising:
      a first light source;
      a first collimating lens element; and
   a light homogenizing element, wherein the first light source provides the first illumination beam, the first illumination beam sequentially passes through the first collimating lens element and the light homogenizing element and is transmitted to the image device,
      wherein the first light source comprises a first solid-state illuminating source array, and the first solid-state illuminating source array comprises a plurality of solid-state illuminating sources arranged in an array, and
      wherein the image beam exits the projection apparatus and is converged to a stop, and the stop is located outside the projection apparatus,
      wherein the projection apparatus further comprises a second light source, a second light collimating lens element and a light combining element;
      wherein the second light source provides the second illumination beam, the second illumination beam is transmitted to the light combining element through the second collimating element, and the light combining element integrates the second illumination beam to form the first illumination beam,
      wherein the second light source comprises a second solid-state illuminating source array, the second solid-state illuminating source array comprises a plurality of solid-state illuminating sources arranged in an array,
      wherein the solid-state illuminating sources of the first solid-state illuminating source array comprise one of the followings: red solid-state illuminating sources, blue solid-state illuminating sources and green solid-state illuminating sources, wherein the solid-state illuminating sources of the second solid-state illuminating source array comprise the other two of the followings: the red solid-state illuminating sources, the blue solid-state illuminating sources and the green solid-state illuminating sources, and wherein the other two solid-state illuminating sources included in the second solid-state illuminating source array are arranged in an interleaving or spaced manner.

8. The projection apparatus of claim 7, wherein the second collimating lens element comprises a collimating lens group, and the collimating lens group comprises at least two lenses.

9. The projection apparatus of claim 7, wherein the light combining element comprises one of a dichroic prism and an X-plate of dichroic mirrors.

10. The projection apparatus of claim 7, wherein the second collimating lens element comprises a collimating lens, the collimating lens comprises an outer curved surface and an inner curved surface, wherein the outer curved surface is a parabolic curved surface or a freeform curved surface, and the inner curved surface is a spherical surface, an aspherical surface, a biconic curved surface or a freeform curved surface.

11. A head-mounted display device, comprising:
   a projection apparatus, comprising:
      an image device, configured to convert a first illumination beam into an image beam; and
      an illumination system, comprising:
         a first light source;
         a first collimating lens element; and
         a light homogenizing element, wherein the first light source provides the first illumination beam, the first illumination beam sequentially passes through the first collimating lens element and the light homogenizing element and is transmitted to the image device, wherein the first light source comprises a first solid-state illuminating source array, and the first solid-state illuminating source array comprises a plurality of solid-state illuminating sources arranged in an array; and at least one waveguide element, comprising:
   a light incident end; and
   a light emerging end, wherein the light incident end is configured to receive the image beam, and the image beam is transmitted by the at least one waveguide element and emitted from the light emerging end, wherein the image beam exits the projection apparatus and is converged to a stop, and the stop is located outside the projection apparatus, wherein the solid-state illuminating sources of the first solid-state illuminating source array comprise red solid-state illuminating sources and blue solid-state illuminating sources, and colors of light beams emitted from the adjacent solid-state illuminating sources are different.

12. The head-mounted display device of claim 11, wherein the image device is located between the illumination system and the stop, and the stop is located at the light incident end of the at least one waveguide element.

13. The head-mounted display device of claim 11, wherein the solid-state illuminating sources of the first solid-state illuminating source array further comprise green solid-state illuminating sources.

14. The head-mounted display device of claim 11, wherein the first collimating lens element comprises a collimating lens, the collimating lens comprises an outer curved surface and an inner curved surface, the outer curved surface is a parabolic curved surface or a freeform curved surface, and the inner curved surface is a spherical surface, an aspherical surface, a biconic curved surface or a freeform curved surface.

15. The head-mounted display device of claim 11, wherein the first collimating lens element comprises a collimating lens group, and the collimating lens group comprises at least two lenses.

16. The head-mounted display device of claim 11, further comprising a light turning element, wherein the image beam is projected to exit the projection apparatus, and is transmitted to the light turning element, and the light turning element turns a transmitting direction of the image beam for transmitting the image beam to the at least one waveguide element.

17. A head-mounted display device, comprising:
   a projection apparatus, comprising:
      an image device, configured to convert a first illumination beam into an image beam; and
      an illumination system, comprising:
         a first light source;
         a first collimating lens element; and
         a light homogenizing element, wherein the first light source provides the first illumination beam, the first illumination beam sequentially passes through the first collimating lens element and the light homogenizing element and is transmitted to the image device, wherein the first light source comprises a first solid-state illuminating source array, and the first solid-state illuminating source array comprises a plurality of solid-state illuminating sources arranged in an array; and at least one waveguide element, comprising:
   a light incident end; and
   a light emerging end, wherein the light incident end is configured to receive the image beam, and the image beam is transmitted by the at least one waveguide element and emitted from the light emerging end, wherein the image beam exits the projection apparatus and is converged to a stop, and the stop is located outside the projection apparatus, wherein the projection apparatus further comprises a second light source, a second light collimating lens element and a light combining element;

wherein the second light source provides the second illumination beam, the second illumination beam is transmitted to the light combining element through the second collimating element, and the light combining element integrates the second illumination beam to form the first illumination beam, wherein the second light source comprises a second solid-state illuminating source array, the second solid-state illuminating source array comprises a plurality of solid-state illuminating sources arranged in an array, wherein the solid-state illuminating sources of the first solid-state illuminating source array comprise one of the followings: red solid-state illuminating sources, blue solid-state illuminating sources and green solid-state illuminating sources, wherein the solid-state illuminating sources of the second solid-state illuminating source array comprise the other two of the followings: the red solid-state illuminating sources, the blue solid-state illuminating sources and the green solid-state illuminating sources, and wherein the other two solid-state illuminating sources included in the second solid-state illuminating source array are arranged in an interleaving or spaced manner.

18. The head-mounted display device of claim 17, wherein the second collimating lens element comprises a collimating lens, the collimating lens comprises an outer curved surface and an inner curved surface, the outer curved surface is a parabolic curved surface or a freeform curved surface, and the inner curved surface is a spherical surface, an aspherical surface, a biconic curved surface or a freeform curved surface.

19. The head-mounted display device of claim 17, wherein the second collimating lens element comprises a collimating lens group, and the collimating lens group comprises at least two lenses.

20. The head-mounted display device of claim 17, wherein the light combining element comprises one of a dichroic prism and an X-plate of dichroic mirrors.

* * * * *